(12) United States Patent
Mutz et al.

(10) Patent No.: US 6,760,424 B1
(45) Date of Patent: Jul. 6, 2004

(54) METHOD FOR ESTABLISHING A PROTECTED COMMUNICATION SEGMENT BETWEEN TWO NETWORK ELEMENTS OF A TELECOMMUNICATION NETWORK AS WELL AS A CORRESPONDING TELECOMMUNICATION NETWORK

(75) Inventors: Martin Mutz, Schondorf/Ammersee (DE); Thomas Sarfert, Baldham (DE)

(73) Assignee: Siemens Aktiengesellschaft, Munich (DE)

(*) Notice: Subject to any disclaimer, the term of this patent is extended or adjusted under 35 U.S.C. 154(b) by 605 days.

(21) Appl. No.: 09/693,106

(22) Filed: Oct. 20, 2000

(30) Foreign Application Priority Data

Oct. 20, 1999 (DE) .......................................... 199 50 546

(51) Int. Cl.[7] .............................................. H04M 7/00
(52) U.S. Cl. ................... 379/221.04; 379/273; 379/331
(58) Field of Search ........................... 379/219, 221.01, 379/221.03, 221.04, 221.05, 221.07, 221.06, 258, 268, 271, 272, 273, 275, 276, 278, 279, 331

(56) References Cited

U.S. PATENT DOCUMENTS

| | | | | |
|---|---|---|---|---|
| 5,454,025 A | * | 9/1995 | Mulrow et al. | ................ 379/45 |
| 5,463,615 A | * | 10/1995 | Steinhorn | .................... 370/221 |
| 5,548,639 A | * | 8/1996 | Ogura et al. | ........... 379/221.04 |
| 5,802,141 A | * | 9/1998 | Kobayashi | .................... 379/22 |
| 5,958,063 A | * | 9/1999 | Croslin et al. | .................. 714/4 |
| 6,052,796 A | * | 4/2000 | Croslin | .......................... 714/4 |
| 6,078,659 A | * | 6/2000 | De Trana et al. | ....... 379/221.03 |
| 6,556,538 B1 | * | 4/2003 | Croslin | ........................ 370/216 |

* cited by examiner

*Primary Examiner*—Roland Foster
(74) *Attorney, Agent, or Firm*—Bell Boyd & Lloyd LLC

(57) ABSTRACT

For establishing a protected communication segment between two network elements of a telecommunication network, a protected connection and a protecting connection must be set up. For this purpose, first cross connections carrying the communication traffic for the protected connection and second cross connections protecting the respective first cross connection for the protecting connection are established between corresponding termination points within these network elements, whereby this occurs in each network element independently of the respectively other network element.

6 Claims, 3 Drawing Sheets

METHOD FOR ESTABLISHING A PROTECTED COMMUNICATION SEGMENT BETWEEN TWO NETWORK ELEMENTS OF A TELECOMMUNICATION NETWORK AS WELL AS A CORRESPONDING TELECOMMUNICATION NETWORK

BACKGROUND OF THE INVENTION

The present invention is directed to a method for establishing a protected communication segment between two network elements of a telecommunication network as well as to a corresponding telecommunication network.

FIG. 1 shows such a protected segment of a telecommunication network, this comprising a protected connection PECT (standing for "Protected") and a connection PING (standing for "Protecting") that protects this connection. Given the example shown in FIG. 1, the protected connection PECT proceeds from a network element NEa via network elements NEb and NEc to a network element NEz. Via intervening network elements NEd and NEe, the protecting connection proceeds parallel to the protected connection PECT, i.e. likewise proceeds between the network elements NEa and NEz. As shall be explained in greater detail below, the switching or establishment of the protected connection PECT and of the protecting connection PING is initiated by a management system MS of the telecommunication network.

The individual network element NEa . . . NEz are connected via corresponding termination points to a neighboring network element, whereby the termination points belonging to one and the same connection are connected via what is referred to as a cross connection. Given the example shown in FIG. 1, the two network elements NEa and NEz between which the two connections PECT and PING proceed therefore comprises termination points TPa . . . TPc, whereby a cross connection cCC that contributes to the protected connection PECT and therefore conducts the communication traffic must be respectively established between the two termination points TPa and TPb of the network elements NEa and NEz, whereas a protecting cross connection pCC contributing to the protecting connection PING must be respectively established between the two termination points TPa and TPc of the network elements NEa and NEz.

The management system assigns an attribute to every individual cross connection, this attribute unambiguously characterizing its function. For example, this attribute can assume the values "connected", "protecting" and "not connected". When a cross connection has the attribute "connected", this means that this cross connection conducts the actual communication traffic. These cross connections are referenced below as "cCC" (standing for "connected cross connection") and are shown in FIG. 1 in the form of solid double lines within the individual network elements NEa . . . NEz. When a cross connection has the attribute "protecting", this means that this cross connection has a protecting function for another cross connection with which it shares exactly one termination point and that has the attribute "connected". Cross connections are referenced "pCC" below (standing for "protecting cross connection") and are shown in FIG. 1 in the form of broken double lines. A cross connection that has the attribute "not connected" is treated like a cross connection that does not exist. This attribute only plays a part for the sequence of the generation of the protecting pCC cross connections since it is always assumed for the generation of a pCC cross connection that the corresponding cross connection previously had the attribute "not connected".

Protecting pCC cross connections are only present in those network elements NEa and NEz in which a protected connection and a corresponding protecting connection branch. A network element in which both the cCC cross connection of the protected connection as well as the pCC cross connection of the protecting connection lie automatically switch the communication traffic from the cCC cross connection onto the pCC cross connection if an interruption of the traffic on the protected connection occurs.

It proceeds from the above description that the establishment and switching of the cCC cross connections and pCC cross connections is of critical significance for the activation of the protected segment or, respectively, of the protected connection PECT and of the protecting connection PING. What is thereby understood by an activation of a connection is the physical establishment of the connection, so that the two termination points of the corresponding connection are physically connected to one another after a successful activation, whereby two termination points within a corresponding network element are physically connected to one another upon establishment or creation of a cross connection.

At the time the protected segment is activated, however, cross connections can already be present in the two network elements NEa and NEz, these having been previously locally switched by the operator of the telecommunication network or having not been eliminated after a circuit because of a system error. In the former instance, communication information can already be transmitted via these already existing cross connections at the point in time of the activation of the protected segment, so that these cross connections already existing before the activation of the protected segment dare not be eliminated or deleted. On the other hand, there is the need to activate the protected segment as requested, i.e. to have the protected connection PECT proceed via the network elements NEa-NEb-NEc-NEz and the protecting connection PING proceed via the network elements NEa-NEd-NEe-NEz in the example shown in FIG. 1.

This problem was hitherto solved such that, before activation of a protected segment, the management system MS has viewed the constellation of existing, locally switched cross connections in the two terminating network elements NEa and NEz together in order to activate the protected connection PECT and the protecting connection PING. The problems that arise given this procedure shall be explained in greater detail below on the basis of the illustrations of FIG. 3, whereby it must be noted that the management system MS administers the protected segment in the form of a model in which the protected connection PECT and the protecting connection PING are modelled. The model assumes that the termination points TPa and TPb of the two network elements in FIG. 1 are respectively connected by a cCC cross connection, whereas the termination points TPa and TPc must be respectively connected by a pCC cross connection. When, as shall be explained in greater detail later on the basis of FIG. 3, a constellation of the cross connections that cannot be reconciled with this model already exists in the two network elements NEa and NEz before the activation of the protected segment, the constellation cannot be described by the model. The result of nonadherence to the pre-conditions would be that the forward and return direction of the traffic proceeds differently (in this case, the traffic given the arrangement shown in FIG.

1 would proceed, for example, from NEa to NEz via NEd and NEe and from NEz to NEa via NEc and NEb), i.e. the position of the protected connection and the protecting connection is not the same then for the forward and return direction of the traffic but depends on the direction of the traffic. A model that could also describe these cases is in fact fundamentally possible. However, it would be significantly more complicated.

A cCC cross connection, i.e. a cross connection with the attribute "connected", cannot be established between two termination points (for example, between the termination points TPa and TPb according to FIG. 1) when one of these two termination points is already connected to another cross connection that has either the attribute "connected" or the attribute "protecting". As has already been mentioned, in contrast, it is a pre-condition for the establishment of a pCC cross connection, i.e. a cross connection with the attribute "protecting", that a cross connection with the attribute "not connected" is already present between the corresponding termination points. The establishment of a cross connection with the attribute "not connected" is always possible. However, a cross connection with the attribute "not connected" can only be turned into a pCC cross connection when one of the two termination points (not both) is already connected to a cCC cross connection (for example, either the termination point TPa or the termination point TPc according to FIG. 1) and this cCC cross connection is not already protected by another pCC cross connection. These previously explained adaptation rules for taking over already existing cCC or pCC cross connections must thus be adhered to in the establishment of the individual cross connections in the network elements NEa and NEz.

The individual illustrations of FIG. 3 show respectively possible constellations for the cross-connections that are already locally switched before an activation of the protected segment between the two network elements NEa and NEz. Let it thereby be assumed that the protected segment shown in FIG. 1 with the protected connection PECT proceeding at the top and the protecting connection PING proceeding at the bottom is to be activated. It is explained below how the previously known management system MS reacted to the constellations shown in FIG. 3.

Given the constellation shown in FIG. 3A, all four cross-connections are already present in the two network elements NEa and NEz, whereby these cross-connections, however, respectively have the incorrect attribute value, i.e. a protecting pCC cross-connection respectively proceeds between the termination points TPa and TPb, whereas a cCC cross-connection is present between the termination points TPa and TPc. This results in the protected connection in the telecommunication network proceeding at the bottom and the protecting connection proceeding at the top. Thus, the position of the protected connection PECT and the position of the protecting connection PING have been interchanged with one another. This special case was already capable of being handled by the previously known management system MS in that the model was correspondingly adapted before the activation of the protected segment. Subsequently, the protected segment was capable of being successfully activated.

Given the constellation shown in FIG. 3B and taking the above-explained adaptation rules into consideration, the requested cCC cross-connection cannot be established between the termination points TPa and TPb of the network element NEa since the termination point TPa is already connected to a cCC cross-connection (leading to TPc). The same is also true of the constellation shown in FIG. 3C, whereby the desired cCC cross-connection between the termination points TPa and TPb cannot be established in the network element NEc either for the same reason.

Given the constellation shown in FIG. 3D, the cCC cross-connection carrying the traffic cannot be established in the network element NEa between TPa and TPb as desired, since the termination point TPa is already connected to two cross-connections, namely a cCC cross-connection between TPa and TPc and a protecting pCC cross-connection between TPa and TPb. Although a cross-connection is thus already present between the termination points TPa and TPb, this has the incorrect attribute "protecting".

Given the constellation shown in FIG. 3E, all four cross-connections are in fact already present, whereby, however, the cross-connections present in the network element NEa respectively have the incorrect attribute. Analogous to FIG. 3D, an establishment of the cCC cross-connection between TPa and TPb of the network element NEa is therefore not possible.

Given the constellation shown in FIG. 3F, finally the desired cCC cross-connection between the termination points TPa and TPb is in fact already present, so that the as yet lacking, protecting pCC cross-connection between the terminal points TPa and TPc could be established. In the network element NEz, however, the cCC cross-connection between the termination points TPa and TPb cannot be established, analogous to the cases shown in FIGS. 3D and 3E, since a pCC cross-connection is already present, i.e. a cross-connection having the incorrect attribute value "protecting".

As has already been briefly mentioned, the constellation of the cross-connections that are already locally switched in the network elements NEa and NEz were viewed together in order to determine the position of the protected connection PECT and of the protecting connection PING. When all four cross-connections with the respectively incorrect attribute were already present in both network elements NEa and NEz (see FIG. 3A), the roles of the protected connection and of the protecting connection were interchanged in the model of the management system MS in order to adapt the model to reality. Subsequently, the activation of the protected segment was implemented with the position of the protected connection and the protecting connection interchanged compared to the original intent.

The constellations shown in FIGS. 3B through 3F, however, were not capable of being previously adapted or activated. In particular, the cross-connections in the network elements NEb . . . NEe were also not switched in these cases. Instead, the compulsory cancellation or elimination of the cross-connections already existing and locally switched was required in these cases in order to be able to establish the protected segment as desired. This, however, in turn resulted in the traffic already proceeding via the locally switched cross-connections was temporarily interrupted.

SUMMARY OF THE INVENTION

An object of the invention is to provide a method for establishing a protected communication segment between two network elements of a telecommunication network as well as a corresponding telecommunication network, whereby an improved adaptation, i.e. take-over of already existing cross-connections is enabled given the activation of the communication segment.

In a method and system of the invention for establishing a protected communication segment between two network elements of a telecommunication network, the protected communication segment between a first network element and a second network element is provided as a protected connection and a protecting connection. The first and second network element are provided as respective termination points via which the respective network element is connected to a neighboring network element. A first cross-connection carrying the communication traffic between a first termination point and a second termination point for the protected connection and a second cross-connection between the first termination point and a third termination point protecting the corresponding first cross-connection for the protecting connection are respectively established within the first and second network elements of the protected communication segment. The first and second cross-connections in the respective or second network elements are established independently of cross-connections already existing in the respective second or first network element.

In contrast to the previously procedure, the two network elements between which the protected segment is to be established and activated are not inventively viewed in common but independently of one another. As a result thereof, the plurality of constellations to be considered is reduced from the previous $N^2$ to N. Due to this reduction, the complete handling of all possible constellations of already existing cross-connections in these two network elements is possible with a justifiable cost-to-benefit ratio. In particular, all adaptable constellations shown in FIG. 2 can also in fact be adapted with this procedure, i.e. taken over. It is only in a following step that the attributes of the cross-connections already existing are checked. If a constellation had been adapted that cannot be described with the existing model, a corresponding alarm is preferably output to the operator of the telecommunication network.

The special quality of the inventive solution is thus comprised, on the one hand that the two sides of a protected segment are viewed independently of one another in view of the already existing cross-connections and, on other hand that already existing or locally switched cross-connections are fundamentally adapted when the corresponding constellation cannot be described with the existing model, i.e. even given the presence of constellations that cannot be described with the model, the corresponding connections are switched, so that the traffic can run in any case. As a result of the output of an alarm to the network operator provided in these cases that cannot be described with the model, it is assured that the network operator can then take appropriate measures.

The invention is explained in greater detail below on the basis of a preferred exemplary embodiment with reference to the attached drawing.

DESCRIPTION OF THE PREFERRED EMBODIMENTS

Figure 1:
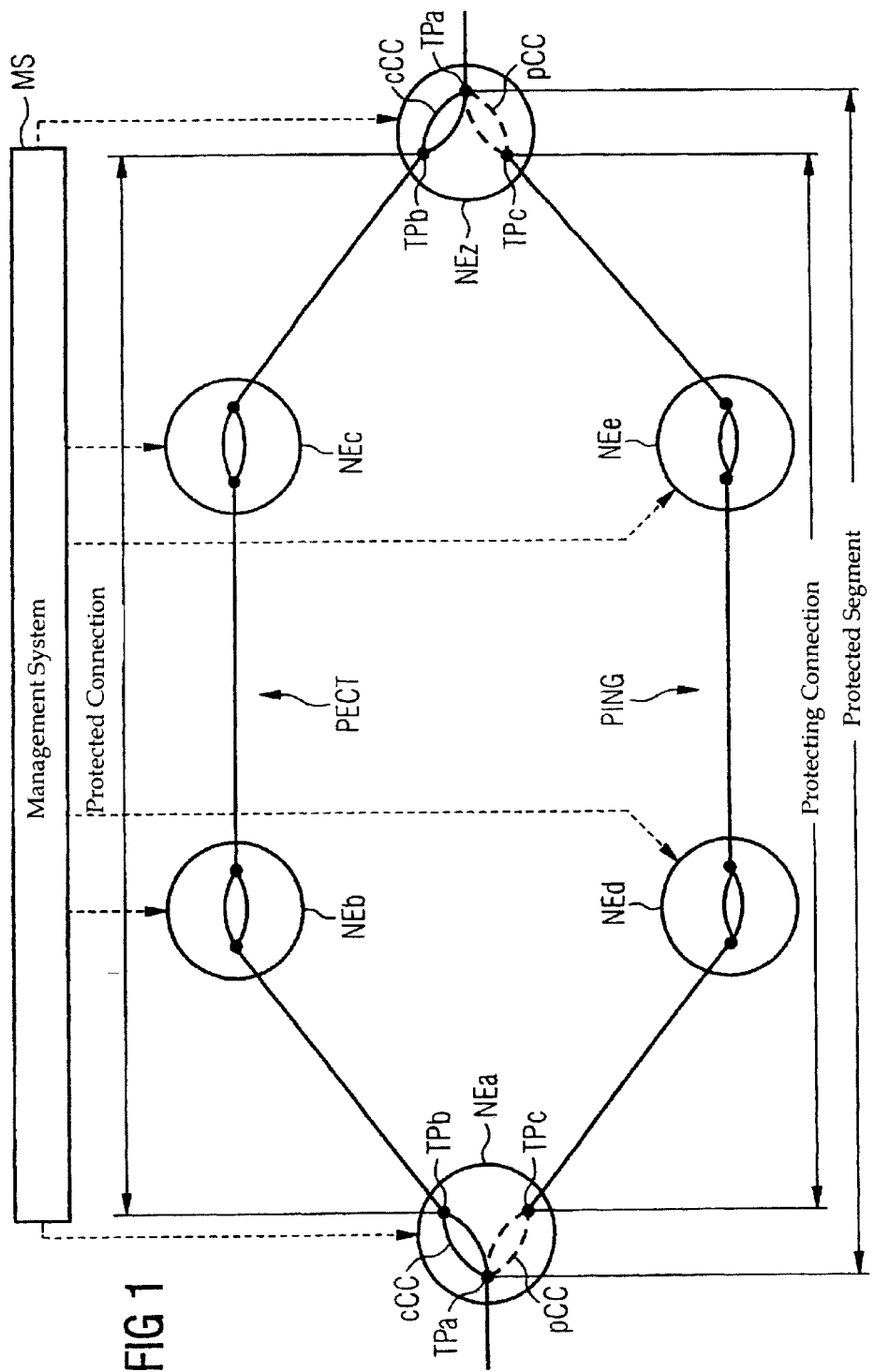
FIG. 1 shows various components of a protected segment of a telecommunication network.

Let the above explanations of FIG. 1 be initially referenced for describing the present invention. It is also assumed below that the protected segment shown in FIG. 1 is to be established, i.e. the protected connection PECT should run via the network elements NEp and NEc, whereas the protecting connection PING should run via the network elements NEd and NEe. Accordingly, the original intent is to establish a traffic-carrying cCC cross-connection, i.e a cross-connection with the attribute "connected" between the termination points TPa and TPb of the network elements NEa and NEz and of establishing a protecting pCC cross-connection, i.e. a cross-connection having the attribute "protecting" between the termination points TPa and TPc.

As has already been set forth, the cross-connections that are possibly already locally switched in the two network elements NEa and NEz must be taken into consideration before the activation of the protected segment, whereby the following adaptation rules must be adhered to.

First, the management system MS attempts to generate the requested cCC and pCC connections in the network elements NEa and NEz independently of one another.

As has already been mentioned, a cCC cross-connection, i.e. a cross-connection having the attribute "connected", cannot be established between two termination points when one of these two termination points is already connected to another cross-connection that has either the attribute "connected" or the attribute "protecting". For establishing a pCC cross-connection, i.e. a cross-connection with the attribute "protecting", in contrast, it is a pre-requisite that one of the two termination points (not both; for example, either the termination point TPa or the termination point TPc according to FIG. 1) is already connected to a cCC cross-connection and this cCC cross-connection is not already protected by another pCC cross-connection. If the desired cross-connections cannot be produced in the NEa or the NEz taking these rules into consideration, the management system MS attempts to interchange the position of the traffic-carrying cCC cross-connection and the protecting pCC cross-connection in the corresponding network element, i.e. an attempt is made given the example shown in FIG. 1 to generate the cCC cross-connection between the termination points TPa and TPc and the pCC cross-connection between the termination points TPa and TPb.

When this is also not possible, the cross-connections already present in the telecommunication network are disturbing to such an extent that the protected segment cannot be activated without canceling at least one of these already existing cross-connections.

When the cross-connections already established in the telecommunication network were adapted before the activation of the protected segment upon application of these adaptation rules, i.e. taken over, the following cases can be present:

1. The constellation deriving therefrom accords with the original request of the network operator, i.e. the protected connection PECT in the example shown in FIG. 1 proceeds between the network elements NEa and NEz via the network elements NEb and NEc, whereas the protecting connection PING proceeds via the network elements NEd and NEe.

2. The constellation deriving therefrom does not conform to the original request of the network operator in the two network elements NEa and NEz, i.e. the protected connection PECT in the example shown in FIG. 1 proceeds between the network elements NEa and NEz via the network elements NEd and NEe, whereas the protecting connection PING proceeds via the network elements NEb and NEc.

3. The constellation deriving therefrom conforms with the original request of the network operator only in one of the network elements NEa and NEz, i.e. the cross-connections are established as requested only in NEa or only NEz.

Case 1 corresponds to the ideal case and results in no further actions whatsoever on the part of the management system MS.

In Case 2, in contrast, the position of the protected connection PECT and of the protecting connection PING is interchanged compared to the original request, so that the management system MS subsequently modifies its model describing the protected segment in this case that the coarse of the protected connection PECT is fixed at the bottom and of the protecting connection PING is fixed at the top in the model.

Case 3 cannot be described by the model. Nonetheless, the individual cross-connections in the network elements NEa and NEz can be established given the above-described procedure in order to enable a traffic flow. In this case, however, an alarm is generated to the network operator in order to inform the network operator that the established cross-connections in one of the two network elements NEa and NEz do not conform to his original request.

Figure 2:
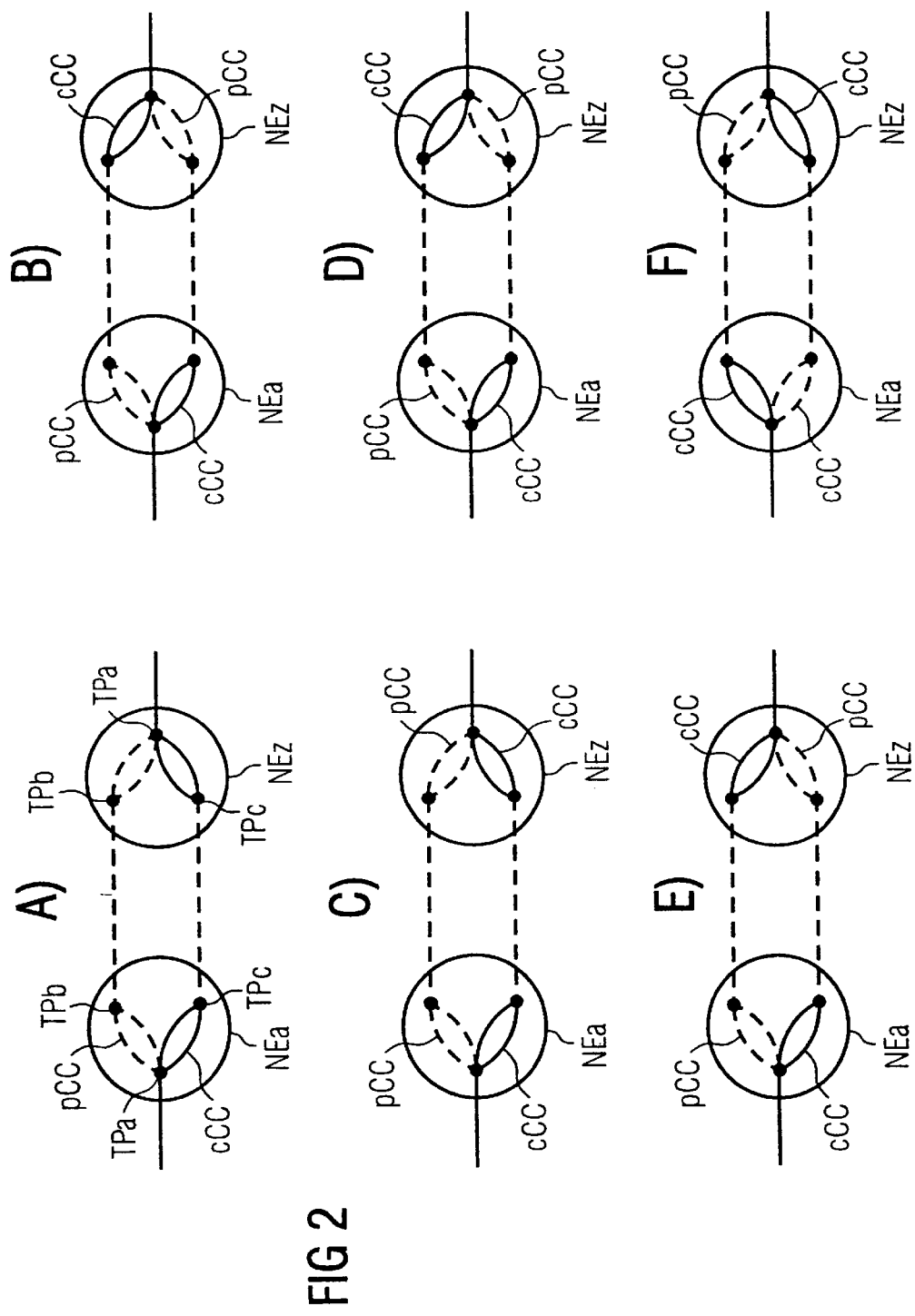
FIGS. 2A–2F show the inventive handling of various constellations of cross-connections shown in FIGS. 3A–3F that can already be present before the establishment of the protected segment shown in FIG. 1.
Figure 3:
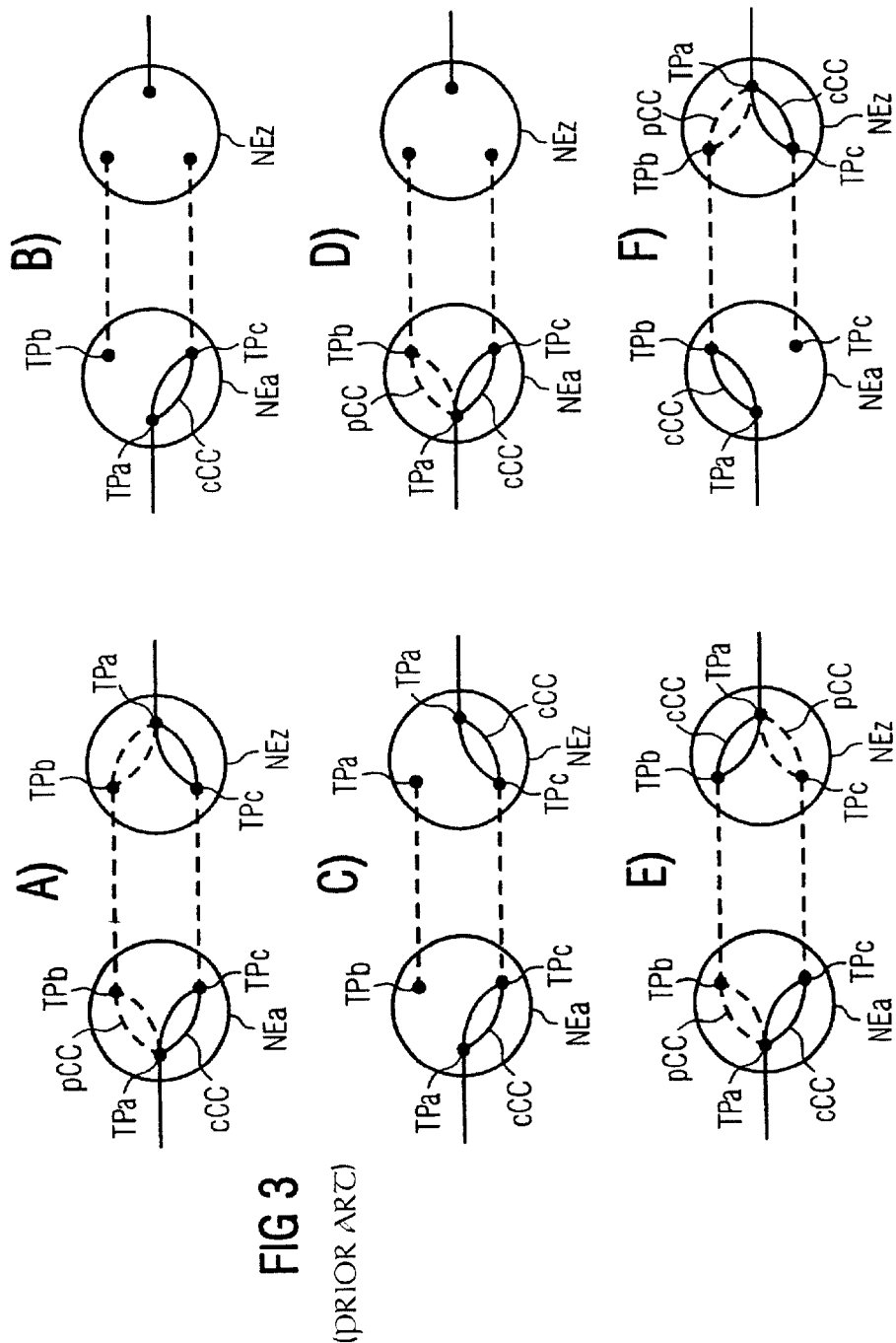

The above-described, inventive procedure shall be explained below with the reference to the illustrations of FIG. 2, whereby the individual illustrations of FIG. 2 show the establishment of the cross-connections in the network elements NEa and NEz that derive given the inventive adaptation of the constellations shown in the corresponding illustrations of FIG. 3. It is thus assumed below that the constellations shown in FIGS. 3A–3F are established and the above-described, inventive adaptation rules are applied thereto, whereby the result respectively resulting therefrom is shown in FIGS. 2A–2F. Given the constellation shown in FIG. 3A, all cross-connections are already present in the network elements NEa and NEz, whereby, however, each cross-connection has the incorrect attribute value, i.e., a protecting pCC cross-connection is respectively present between the termination points TPa and TPb, whereas a traffic-carrying cCC cross-connection is respectively present between the termination points TPa and TPc. This case corresponds to the above-explained Case 2 and is consequently handled as described therein, i.e. a note is made to the effect that the protected connection proceeds at the bottom and the protecting connection proceeds at the top. Overall, the handling of this constellation corresponds to the prior procedure.

Given the constellation shown in FIG. 3B, no request-conforming cCC cross-connection can be placed between the termination points TPa and TPb in the network element NEa, since a cCC cross-connection is already present between TPa and TPc. According to the above-described adaptation rules, a pCC cross-connection that protects this cCC cross-connection is generated between the termination points TPa and TPb. The requested constellation of cross-connections, in contrast, can be produced in the network element NEz, so that the constellation shown in FIG. 2B drives overall and, accordingly, the above-described Case 3 is present.

Given the constellation shown in FIG. 3C, the pCC cross-connection must be placed between the termination points TPa and TPb both in the network element NEa as well as in the network element NEz since a cCC cross-connection is already respectively present between TPa and TPc. The constellation shown in FIG. 2C derives in the network elements NEa and NEz, this corresponding to the above-explained Case 2.

Both cross-connections are already present in the network element NEa given the constellation shown in FIG. 3D. However, they respectively have the incorrect attribute value. In the network element NEz, in contrast, the cross-connections can be established as requested, so that the constellation shown in FIG. 2D is produced, this corresponding to Case 3.

All four cross-connections are already present in the network elements NEa and NEz in FIG. 3E, whereby the two cross-connections in the network element NEa, however, have the incorrect attribute value, whereas the position of the cross-connections is correct in the network element NEz. This constellation must be taken over taking the above adaptation rules into consideration (see FIG. 2E), so that Case 3 is present.

Given the constellation shown in FIG. 3F, a cCC cross-connection in the network element NEa is already present between TPa and TPb, so that the as yet lacking pCC cross-connection can be established as requested between TPa and TPc. Both cross-connections are already present in the network element NEz, whereby, however, both have the incorrect attribute value. Due to the inventive adaptation, thus, the constellation shown in FIG. 2F derives, as present in Case 3.

It can thus be stated overall that the network elements NEa and NEz are considered to be completely independent of one another in the establishment of as yet lacking cross-connections in the network elements NEa and NEz. As a result of the inventive adaption and compared to the traditional procedure, an additional constellation, namely the constellation shown in FIG. 2C, can be described by the predetermined model of the management system MS. Compared to the initially described, traditional procedure, moreover, all constellations shown in FIG. 2 are now completely adapted in order to enable a traffic flow, even though the constellations that thereby derive and are shown in FIGS. 2B and 2D–2F cannot be described by the model of the management system MS since the previously explained Case 3 is respectively established. In both instances, however, an appropriate alarm is output.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for establishing a protected communication segment between two network elements of a telecommunication network, the method comprising the steps of:

(a) providing the protected communication segment between a first network element and a second network element as a protected connection and a protecting connection;

(b) providing the first and second network elements with respective first, second, and third termination points via which the respective network element is connected to a neighboring network element;

(c) establishing a first cross connection carrying communication traffic for the protected connection between the first termination point and the second termination point and a second cross-connection for the protecting connection between the first termination point and the third termination point protecting the corresponding first cross connection within the respective first and second network elements of the protected communication segment;

(d) establishing the first and second cross connections in the respective first and second network element independently of cross connections already existing in the respective first and second network element;

(e) respectively establishing the first cross connection between the corresponding first and second termination points in the respective first and second network element when one of the corresponding first and second termination points is not already connected to a first or second cross connection; and (f) subsequently respectively establishing the second cross connection between the corresponding first and third termination points in the respective first and second network element only when one of the corresponding first and third termination points is already connected to an existing first cross connection, and a second cross connection protecting the existing first cross connection is not already established for the existing first cross connection.

2. The method according to claim 1, wherein when no combination of a first and second cross connection was able to be established in the respective first and second network element via steps (e) and (f), the method further comprises the steps of:

(g) respectively establishing the first cross connection between the corresponding first and third termination points in the respective first and second network element when one of the corresponding first and third termination points is not already connected to a first or second cross connection; and (h) subsequently respectively establishing the second cross connection between the corresponding first and second termination point in the respective first and second network element when one of the corresponding first and second termination points is already connected to an existing first cross connection, and a second cross connection protecting the existing first cross connection is not already established for the existing first cross connection.

3. The method according to claim 2, wherein an alarm is generated when, after implementation of steps (e)–(h), the combination of the first and second cross connections established in the first network element with the first and second cross connections established in the second network element is such that, as a result thereof, the protected connection and the protecting connection are formed neither in a requested position nor in a position interchanged with one another.

4. The method according to claim 1, wherein the first and second cross connections in the first and second network elements are also respectively established when a combination of the first and second cross connections to be established in the first network element with the first and second cross connections to be established in the second network element is not of such a nature that, as a result thereof, the protected connection and the protecting connection are formed in one of a requested position and a position interchanged with one another.

5. A telecommunication network, comprising a plurality of network elements, whereby each network element comprises first, second, and third termination points via which the respective network element is connected to a neighboring network element;

a protected communication segment established between a first network element and a second network element that comprises a protected connection and a protecting connection;

a controller for (a) respectively establishing within the first and second network element a first cross connection carrying communication traffic for the protected connection between the corresponding first and second termination points and a second cross connection for the protecting connection between the corresponding first and third termination points protecting the corresponding first cross connection in order to establish the protected communication segment, (b) respectively establishing the first and second cross connections in the respective first and second network element respectively independently of cross-connections already existing in the respective second and first network element; (c) respectively establishing the first cross connection between the corresponding first and second termination points in the respective first and second network element when one of the corresponding first and second termination points is not already connected to a first or second cross connection; and (d) subsequently respectively establishing the second cross connection between the corresponding first and third termination points in the respective first and second network element only when one of the corresponding first and third termination points is already connected to an existing first cross connection, and a second cross connection protecting the existing first cross connection is not already established for the existing first cross connection, and when no combination of a first and second cross connection was able to be established in the respective first and second network element via (c) and (d), the controller further is for (e) respectively establishing the first cross connection between the corresponding first and third termination points in the respective first and second network element when one of the corresponding first and third termination points is not already connected to a first or second cross connection, and (f) subsequently respectively establishing the second cross connection between the corresponding first and second termination point in the respective first and second network element when one of the corresponding first and second termination points is already connected to an existing first cross connection, and a second cross connection protecting the existing first cross connection is not already established for the existing first cross connection; and a memory in the controller to store a transposed position of the protected connection and the protecting connection when, after implementation of the steps (c)–(f), a combination of the first and second cross connections established in the first network element with the first and second cross connections established in the second network element is such that, as a result thereof, the protected connection and the protecting connection are formed in a position interchanged with one another.

6. The telecommunication network according to claim 5, wherein the controller assigns a specific attribute to each cross connection of a network element with which the corresponding cross connection is defined as one of a first cross connection carrying the communication traffic and a protecting second cross connection.